United States Patent [19]
Sakai et al.

[11] Patent Number: 4,791,833
[45] Date of Patent: Dec. 20, 1988

[54] REDUCTION GEAR MECHANISM FOR MOTOR-DRIVEN DRILL INCORPORATING SPEED CHANGING MECHANISM

[75] Inventors: Yasuharu Sakai; Shinichi Segawa; Tadashi Yasui, all of Kyoto, Japan

[73] Assignee: Japan Storage Battery Co., Ltd., Kyoto, Japan

[21] Appl. No.: 68,755

[22] Filed: Jun. 30, 1987

Related U.S. Application Data

[63] Continuation of Ser. No. 754,489, Jul. 12, 1985, abandoned.

[30] Foreign Application Priority Data

Jul. 16, 1984 [JP] Japan ................................ 59-148291
Oct. 11, 1984 [JP] Japan ................................ 59-213225

[51] Int. Cl.$^4$ .......................................... F16H 3/44
[52] U.S. Cl. .................................... 74/769; 74/768; 74/785
[58] Field of Search ................. 74/785, 768, 769, 342, 74/343; 310/83

[56] References Cited

U.S. PATENT DOCUMENTS

| | | | |
|---|---|---|---|
| 1,228,472 | 6/1917 | Olson | 74/785 |
| 1,514,872 | 11/1924 | Starr | 74/785 |
| 1,792,484 | 2/1931 | Fawick | 74/785 |
| 1,909,330 | 5/1933 | Banker | 74/785 X |
| 2,331,684 | 10/1943 | Henningsen | 74/785 |
| 2,911,854 | 11/1959 | Fabian | 74/785 X |
| 3,055,236 | 9/1962 | Born | 74/785 |
| 3,127,801 | 4/1964 | Binns | 74/785 X |
| 3,774,476 | 11/1973 | Söhnlein et al. | 74/785 |
| 3,872,742 | 3/1975 | States | 74/785 |
| 4,274,023 | 6/1981 | Lamprey | 310/83 |
| 4,569,252 | 2/1986 | Harper | 74/785 |

FOREIGN PATENT DOCUMENTS

| 1072143 | 9/1954 | France | 74/785 |
|---|---|---|---|
| 2102515 | 2/1983 | United Kingdom | 74/785 |

*Primary Examiner*—Dirk Wright
*Assistant Examiner*—Harold F. Macris
*Attorney, Agent, or Firm*—Sughrue, Mion, Zinn, Macpeak & Seas

[57] ABSTRACT

A reduction gear mechanism, incorporating a speed changing mechanism, for use with a motor-driven drill. The mechanism includes at least one planetary speed reducer having a sun gear to which rotation of an electric motor is transmitted, a plurality of planet gears arranged around the sun gear and engaged with the sun gear, an internal gear internally engaged with the planet gears, and a planet gear holding plate which pivotally supports the planet gears on one side of it and has an output shaft on the other side of it. The internal gear of at least one planetary speed reducer includes a cylindrical internal gear. The reduction gear includes mechanisms for locking the cylindrical internal gear to prevent rotation of the cylindrical internal gear and for engaging the cylindrical internal gear with the planet gear holding plate so that the cylindrical internal gear and the planet gear holding plate rotate as a single unit.

4 Claims, 3 Drawing Sheets

REDUCTION GEAR MECHANISM FOR MOTOR-DRIVEN DRILL INCORPORATING SPEED CHANGING MECHANISM

This is a continuation of application Ser. No. 754,489, filed July 12, 1985, now abandoned.

BACKGROUND OF THE INVENTION

The present invention relates to a reduction gear with a speed changing mechanism used for a motor-driven driven drill.

A planetary speed reducing mechanism is extensively employed as a speed reducing mechanism for a motor-driven drill because it is relatively simple in construction and has input and output shafts located on the same axis. However, the planetary speed reducing mechanism is disadvantages in that it is inherently difficult to incorporate a speed changing system within the planetary mechanism, and accordingly it is necessary to provide a speed changing mechanism in addition to the planetary speed reducing mechanism, with the result that the power transmission mechanism is necessarily intricate.

SUMMARY OF THE INVENTION

Overcoming these difficulties, in accordance with the invention, a speed changing mechanism is included in a planetary speed reducing mechanism without impairing the function of the latter. More specifically, a reduction gear mechanism provided by the invention comprises a sun gear to which rotation of an electric motor is transmitted, a plurality of planet gears engaged with the sun gear, a cylindrical internal gear engaged with the planet gears, and a planet gear holding plate which pivotally supports the planet gears on one side and has the output shaft on the other side, and further including means for locking the cylindrical internal gear to prevent rotation of the latter, and means for rotatably engaging the cylindrical internal gear with the planet gear holding plate. Furthermore, the reduction gear may be modified by arranging a plurality of such planetary speed reducers coupled in series, with at least one of the speed reducers having the above-described functions.

The means for locking the internal gear to prevent the rotation of the latter and the means for engaging the internal gear with the planet gear holding plate are employed to slide the internal gear along the gear axis. For this purpose, engaging teeth are formed on the planet gear holding plate, the internal gear, and the gear case.

When, in the reduction gear mechanism of the invention thus constructed, the internal gear is slid towards the end wall of the gear case, the internal teeth or engaging teeth of the internal gear are disengaged from the engaging teeth of the planet gear holding plate and then engaged with the engaging teeth of the gear case so that the internal gear is locked, and the original functions of the planetary speed reducing mechanism are performed. That is, as the sun gear is rotated, the planet gears, being engaged with the sun gear, are rotated and revolved along the internal teeth of the internal gear. Since the planet gears are pivotally supported by the planet gear holding plate, the revolution of the planet gears is transmitted to the planet gear holding plate so that a rotational output is provided at the output shaft of the holding plate in the following reduction gear ratio:

(number of teeth of internal gear/number of teeth of sun gear)+1.

When the internal gear is moved towards the planet gear holding plate, the internal gear is disengaged from the gear case, while the internal teeth or engaging teeth of the internal gear are engaged with the engaging teeth of the planet gear holding plate. As a result, the internal gear, the planet gears, and the planet gear holding plate are joined together, and therefore no revolution of the planet gears along the internal gear occurs. Accordingly, the planet gears are not rotated, and the sun gear rotates the internal gear and the planet gear holding plate as a single unit. That is, the reduction gear is inoperative, and the rotation of the sun gear is directly transmitted to the output shaft provided on the planet gear holding plate.

In other words, the reduction gear can perform two actions: (1) when the internal gear is locked with respect to the gear case, the reduction gear operates as an ordinary planetary speed reducing mechanism, and (2) when the internal gear is disengaged from the gear case and engaged with the planet gear holding plate, the input rotation is outputted directly, that is, the input and output rotational speeds are the same.

DESCRIPTION OF THE PREFERRED EMBODIMENTS

Figure 1:
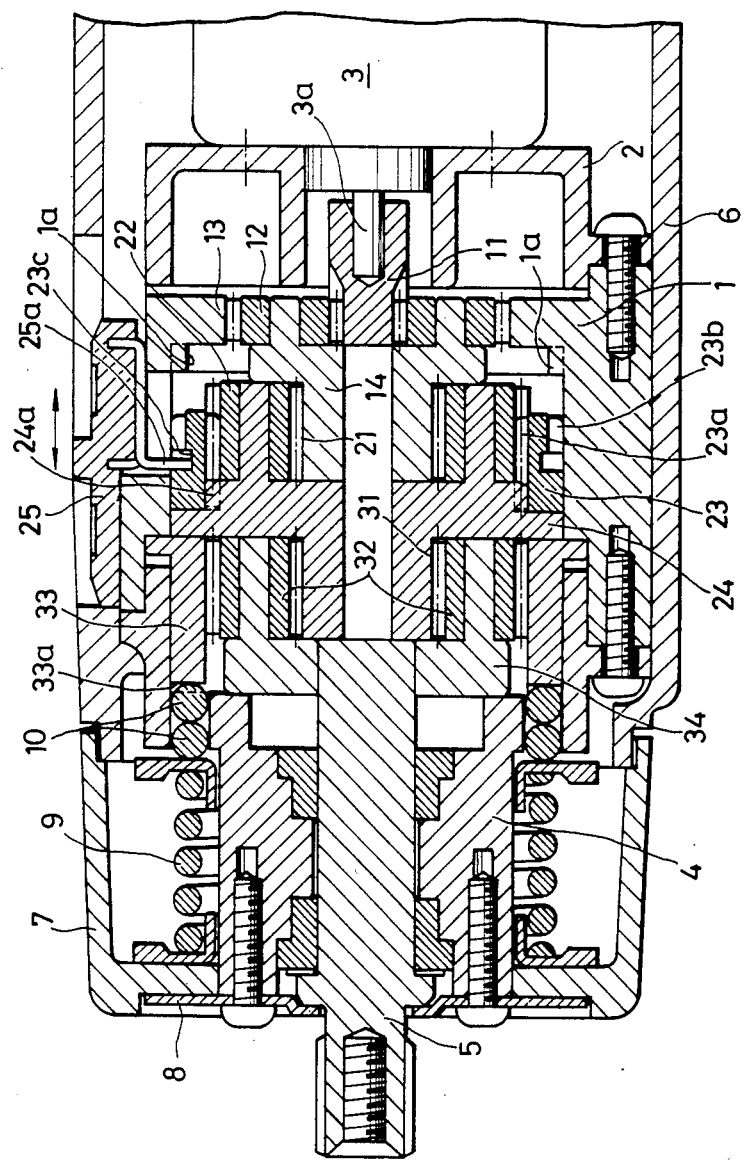
FIG. 1 is a sectional view showing a first embodiment of a reducing gear mechanism according to this invention.

FIG. 1 is a sectional view showing an example of a reduction gear mechanism construction according to the invention. In this example, three planetary speed reducing mechanisms are provided, and a speed changing mechanism of the invention is employed in a second of the planetary speed reducing mechanisms.

In FIG. 1, reference numeral 1 designates a gear case. A motor 3 is mounted on the outer surface of one end of the case 1 through a mounting fixture 2. Reference numeral 4 designates a bearing, which also serves as the end wall of the gear case 1 as well as rotatably supporting the output shaft 5, the bearing 4 being engaged with and fixedly secured to the case 1 with screws; 6, an outer case in which the motor 3 and the speed reducer case 1 are mounted; and 7, a cover surrounding the bearing 4. The cover 7 is rotatably mounted on the rear end of the bearing 4 through a washer 8, which serves also as a retainer for the output shaft 5, so that the cover 7 can be used as a knob for adjusting the elastic pressure of a ball clutch (described below).

As described above, the three planetary speed reducing mechanisms are accommodated within the case 1. In FIG. 1, reference numeral 11 designates a sun gear rotationally fixed on the output shaft 3a of the motor 3; and 12, a plurality of planet gears engaged with the sun gear 11, the planet gears 12 rotatably mounted on shafts extending from a planet gear holding plate 14. The other end portion of the planet gear holding plate 14 is formed into a sun gear 21 for the next planetary speed reducing mechanism. A cylindrical internal gear 13 is engaged with the planet gears 12. In the case of the mechanism of FIG. 1, in order to reduce the total number of components, the cylindrical internal gear 13 is mounted in the gear case 1. The above-described components 1 through 14 form the first stage of the planetary speed reducing mechanism.

The second stage of the planetary speed reducing mechanism includes the aforementioned sun gear 21 (which is a part of the planet gear holding plate 14), a plurality of planet gears 22 engaged with the sun gear 21, a planet gear holding plate 24 pivotally supporting the planet gears 22, and a cylindrical internal gear 23 engaged with the planet gears 22. Engaging teeth 23b are formed in the outer wall of the cylindrical internal gear 23. The cylindrical internal gear 23 is rotatably arranged in the gear case 1 and is slidable along the axis of the gear (horizontally in FIG. 1). Engaging teeth 24a and 1a, engageable with the internal gear 23, are formed in the outer wall of the planet gear holding plate 24 and in the part of the inner wall of the gear case 1 closer to its end face, respectively. Further in FIG. 1, reference numeral 25 designates a slide lever for sliding the aforementioned cylindrical internal gear 23 in the axial direction of the gear. The operating lever 25a of the slide lever 25 is slidably engaged with an annular groove 23c formed in the middle of the outer wall of the cylindrical internal gear 23. By sliding the slide lever 25 along the gear axis, the cylindrical internal gear 23 can be selectively moved towards the planet gear holding plate 24 (to the position shown in FIG. 1) or towards the end face of the gear case.

The third stage of the planetary speed reducing mechanism includes a sun gear 31 formed integrally with the planet gear holding plate 24 of the second planetary speed reducing mechanism, planet gears 32 engaged with the sun gear 31, a planet gear holding plate 34 pivotally supporting the planet gears 32, and a cylindrical internal gear 33 engaged with the planet gears 32. The output shaft 5 is connected to the planet gear holding plate 34 to transmit torque.

The cylindrical internal gear 33 is rotatably mounted in the gear case 1. The rear end face 33a of the internal gear 33 is protruded, and steel balls 10 are abutted against the rear end face by a coiled spring 9, thus forming a ball clutch. When a rotational moment larger than a predetermined value is applied to the output shaft 5, the steel balls 10 are pushed back by the protruding rear end face 33a of the cylindrical internal gear 33 so that the latter idles to prevent application of an excessively large load to the motor. A cam formed in the inner wall of the aforementioned cover 7 is engaged with a retainer for the coiled spring 9. The cover 7 is turned to move the retainer back and forth to adjust the compression of the coiled spring 9 to thereby adjust the elastic pressure of the ball clutch.

In the device of the invention constructed as described above, when the slide lever 25 is moved towards the motor 3, the second cylindrical internal gear 23 coupled to the slide lever 25 is moved towards the end face of the gear case 1. As a result, the engaging teeth 23b formed in the outer wall of the cylindrical internal gear 23 are engaged with the engaging teeth 1a formed in the inner wall of the gear case 1, that is, the cylindrical internal gear 23 and the gear case 1 rotate together, and thus the operation of an ordinary planetary speed reducing mechanism is performed. In other words, the torque reduced by the first planetary speed reducing mechanism rotates the second sun gear 21, thereby to rotate the planet gears 22. Being internally engaged with the cylindrical internal gear 23, the planet gears 22 revolve in the direction of input rotation along with the cylindrical internal gear (planetary motion) to rotate the planet gear holding plate 24 at a reduced speed, the rotation of the latter being transmitted to the third speed reducing mechanism.

If the slide lever 25 is moved towards the output shaft 5, the cylindrical internal gear is disengaged from the gear case 1, whereupon the cylindrical internal gear 23 is engaged with the planet gear holding plate 24 having engaging gears 24a on its outer wall so that the former is made rotationally integral with the latter. Therefore, the rotation and revolution of the planet gears are stopped, that is, the sun gear 21 is directly coupled to the planet gear holding plate 24. Accordingly, in this case, the planet gear holding plate 24 does not function as a part of the speed reducer but transmits the torque of the sun gear 21 to the following stage directly.

In the above-described embodiment, the engaging teeth of the internal gear which selectively engage with the second planet gear holding plate 24 are the internal teeth 23a, and the engaging teeth 23b formed in the outer wall are selectively engaged with the gear case 1. However, it should be noted that all that is necessary for the engaging teeth is to engage with the internal gear, and therefore the engaging teeth are not limited in position and in configuration.

Figure 2:
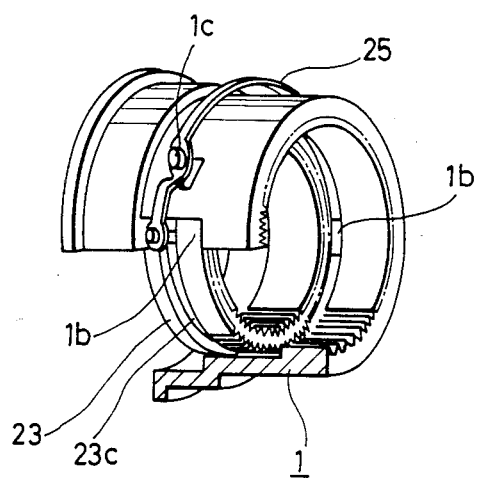
FIG. 2 is a perspective view, with parts cut away, showing an example of a cylindrical internal gear sliding arrangement in the device of the invention.
Figure 3:
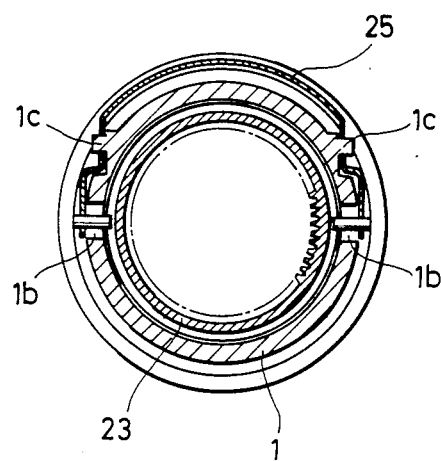
FIG. 3 is a sectional view of the arrangement shown in FIG. 2.

FIGS. 2 and 3 show an example of an arrangement for sliding the cylindrical internal gear 23. More specifically, FIG. 2 is a perspective view, with parts cut away, showing parts of the gear case 1 and the cylindrical internal gear 23, and FIG. 3 is a sectional view of the same. As shown in these figures, an annular groove 23c is formed in the outer wall of the cylindrical internal gear 23, and both ends of the lever 25, having fulcrums 1c on the gear case, are inserted into windows 16 formed in the gear case 1 so that the ends are slidably engaged with the annular groove 23c. Therefore, the cylindrical internal gear can be moved along the gear axis by operating the lever 25.

EMBODIMENT 2

Figure 4:
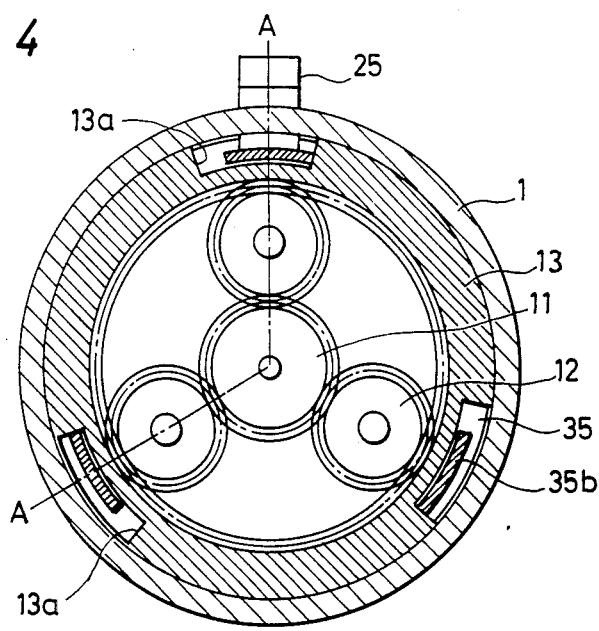
FIG. 4 shows a second embodiment of a reducing gear mechanism according to the invention.
Figure 5:
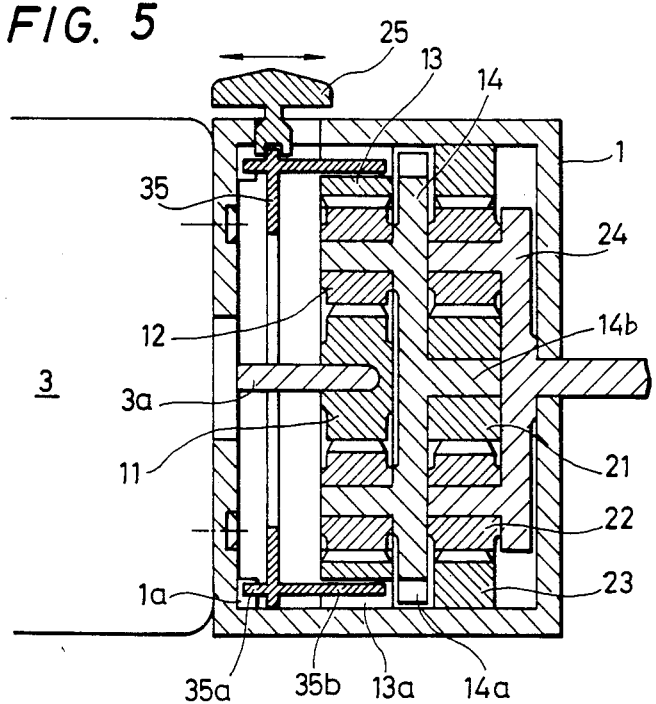
FIG. 5 is a sectional view taken along a line A—A in FIG. 4.

FIG. 4 is a sectional view showing another example of a reduction gear mechanism of the invention, and FIG. 5 is a sectional view taken along a line A—A in FIG. 4. In this example, two planet gear speed reducing mechanisms are arranged in series, and the mechanism of the invention is employed in the first planet gear speed reducing mechanism.

In this example, a rotatable ring board 35 is arranged between an internal gear 13 and one end of a gear case 1, and the ring board 35 thus arranged is operated to lock the cylindrical internal gear 13 or to cause the latter to engage a planet gear holding plate 14. In FIGS. 4 and 5, reference numeral 35 designates the ring board arranged between the end face of the internal gear 13 and the end of the gear case 1. The ring board 35 has a stop 35a which is fitted in a groove 1d formed in the gear case 1. Further, the ring board 35 has arms 35b on the side thereof opposite the side where the stop 35a is provided. When the ring board 35 is moved toward the internal gear 13, the arms 35b reach cuts 14a of the planet gear holding plate 14 through through-holes 13a formed in the peripheral portion of the internal gear 13. Further in FIGS. 4 and 5, reference numeral 25 designates a slide lever which is externally slid to move the ring board 25 between the end of the gear case 1 and the internal gear 13.

In the two-stage planet gear speed reducing device thus constructed, when the stop 35a of the ring board 35 is fitted in the groove 1d at the end wall of the gear case 1, the internal gear 13 is secured to the gear case 1 through the stop 35a and the arms 35b of the ring board. Therefore, the rotation of the motor 3 is transmitted through a sun gear 11 to planet gears 12. As a result, the planet gears 12 are rotated and revolved as they are engaged with the internal gear 13 (planet motion), and thus the planet gear holding plate 14 pivotally supporting the planet gears 12 is rotated with the reduction gear ratio and the rotation of the planet gear holding plate 14 is transmitted to the following speed reducing mechanism. When, on the other hand, the slide lever 25 is moved in the opposite direction to move the ring board 35 towards the internal gear 13, the stop 35a of the ring board is disengaged from the groove 1d of the gear case 1 and the arms 35b of the ring board are inserted into the cuts 14a of the planet gear holding plate 14 through the through-holes 13a formed in the peripheral portion of the internal gear 13, and thus the internal gear 13 is coupled through the arms 35a to the planet gear holding plate 14. Therefore, the revolution of the planet gears 12 is stopped; that is, the planet gears 12 cannot rotate. Accordingly, the sun gear 11, the planet gears, and the internal gear 12 rotate as a single unit in the gear case 1 so that an output shaft 14b, which is provided on the planet gear holding plate 14 to drive the following stage, is rotated at the same speed as the motor 3.

As is apparent form the above description, in the reducing gear device of the invention, the gear case, the cylindrical internal gear, and the planet gear holding plate are related to one another as follows: When the cylindrical internal gear is rotationally engaged with the gear case, the device serves as an ordinary reduction gear. When the cylindrical internal gear is disengaged from the gear case and rotated with the planet gear holding plate, the input sun gear, the planet gears, and the planet gear holding plate act as a single rotary unit; that is, the device does not function as a reduction gear. Therefore, the speed of the planetary reduction gear can be changed with a considerably simple mechanism. This greatly contributes to a reduction of the size, weight and cost of a motor-driven drill.

We claim:

1. In a reduction gear mechanism with a speed changing mechanism for a motor-driven drill including a gear case, at least one planetary speed reducer comprising a sun gear to which rotation of an electric motor is transmitted, a plurality of planet gears arranged around said sun gear and engaged with said sun gears, an internal gear internally engaged with said planet gear, and a planet gear holding plate which rotatably supports said planet gears on one side thereof and has an output shaft on the other side thereof, the improvement wherein:
    said internal gear of at least one planetary speed reducer comprises a slidably mounted cylindrical internal gear, said cylindrical gears comprising a set of internal gear teeth engaged with said planet gear and a set of outer gear teeth, an annular groove being formed in an outer surface of said internal gear;
    said planet gear holding plate has a set of gear teeth engaged with said internal gear teeth of said internal gear in a first position of said internal gear to allow said internal gear to rotate with said planet gear holding plate;
    a separate set of fixed teeth is fixed to a structure within which said sun gear rotates, and said set of outer gear teeth of said internal gear is engaged in a second position of said internal gear with said fixed teeth to rotatably lock said internal gear,
    and wherein there is provided a lever for sliding said internal gear between said first and second position, said lever extending in a semicircle around said internal gear, said gear case extending circumferentially around said internal gear, said lever being pivotally mounted to said gear case, and said lever having pins on opposite sides thereof passing through windows in said gear case and slidably received in said annular groove at opposed points around the circumference of said internal gear.

2. The reduction gear as claimed in claim 1, wherein said separate set of fixed teeth is provided on a second internal gear, said second internal gear being fixed to said gear case.

3. The reduction gear as claimed in claim 1, wherein said at least one planetary speed reducer comprises a multistage planetary speed reducer, said output shaft of said planet gear holding plate comprising a sun gear engaged with planet gears of a following stage.

4. In a reduction gear mechanism with a speed changing mechanism for a motor-driven drill including a gear case, at least one planetary speed reducer comprising a sun gear to which rotation of an electric motor is transmitted, a plurality of planet gears arranged around said sun gear and engaged with said sun gear, an internal gear internally engaged with said planet gear, and a planet gear holding plate which rotatably supports said planet gears on one side thereof and has an output shaft of the other side thereof, the improvement wherein:
    a ring board is arranged between said cylindrical internal gear and an end wall of said gear case, said ring board rotatable and movable along said gear axis, said right board having arms on one side extendable through through-holes formed in said cylindrical internal gear to cuts formed in said planet gear holding plate and a stop on the other side of said ring board which is engageable with a groove formed in a wall of said gear case;
    a slide lever is provided for moving said ring board, said lever being inserted into a window formed in said gear case, said lever being slidably engageable with said cuts and said groove; and
    said planetary speed reducer comprises a multi-stage planetary speed reducer, said output shaft of said planet gear holding plate comprising a sun gear engaged with planet gears of a following stage,
    wherein, when said ring board is moved towards said cylindrical internal gear, said cylindrical internal gear is engaged with said planet gear holding plate through said arms of said ring board so that said cylindrical internal gear and said planet gear holding plate are rotated as one unit, and when said ring board is moved towards said end wall of said gear case, said cylindrical internal gear and said planet gear holding plate are disengaged from one another, and said stop is engaged with said groove formed in said end wall of said gear case so that said ring board and said cylindrical internal gear are locked, whereby rotation of said ring board and said internal gear is prevented.

* * * * *